(12) United States Patent
Wu

(10) Patent No.: US 10,848,728 B2
(45) Date of Patent: Nov. 24, 2020

(54) COLOR CORRECTION METHOD AND DEVICE, AND COMPUTER-READABLE STORAGE MEDIUM THEREOF

(71) Applicant: Shanghai Xiaoyi Technology Co., Ltd., Shanghai (CN)

(72) Inventor: Xie Wu, Shanghai (CN)

(73) Assignee: SHANGHAI XIAOYI TECHNOLOGY CO., LTD., Shanghai (CN)

(*) Notice: Subject to any disclaimer, the term of this patent is extended or adjusted under 35 U.S.C. 154(b) by 114 days.

(21) Appl. No.: 16/260,229

(22) Filed: Jan. 29, 2019

(65) Prior Publication Data

US 2019/0238815 A1 Aug. 1, 2019

(30) Foreign Application Priority Data

Jan. 31, 2018 (CN) .......................... 2018 1 0099691

(51) Int. Cl.
*H04N 9/73* (2006.01)
*G06F 17/16* (2006.01)
(Continued)

(52) U.S. Cl.
CPC .............. *H04N 9/73* (2013.01); *G06F 17/16* (2013.01); *H04N 9/646* (2013.01); *H04N 9/67* (2013.01)

(58) Field of Classification Search
CPC ........... H04N 9/73; H04N 9/67; H04N 9/646; H04N 9/045; H04N 9/735; G06F 17/16
See application file for complete search history.

(56) References Cited

U.S. PATENT DOCUMENTS

| 5,555,022 A | * | 9/1996 | Haruki ................. | H04N 9/735 348/223.1 |
| 5,668,596 A | * | 9/1997 | Vogel .................... | H04N 9/045 348/222.1 |

(Continued)

FOREIGN PATENT DOCUMENTS

| CN | 1288173 A | 3/2001 |
| CN | 101345813 A | 1/2009 |

(Continued)

OTHER PUBLICATIONS

SIPO First Office Action corresponding to Application No. 201810099691.3; dated Mar. 27, 2019.

*Primary Examiner* — John B Strege
(74) *Attorney, Agent, or Firm* — Cantor Colburn LLP

(57) ABSTRACT

A color correction method and device, and computer-readable storage medium thereof, the color correction method including: obtaining an image to be corrected and a color temperature of the image, the image being in a YUV color space; determining first and second adjacent quadrants in a UV plane associated with each pixel point in the image according to a position of the pixel point on the UV plane; and performing color correction on each pixel point using correction matrices respectively corresponding to the first and second adjacent quadrants and the image color temperature, each correction matrix being calculated in advance of the color corrections according to the chrominance value of a color patch in each of the first and second quadrants, the color temperature, and a standard value corresponding to the color patch.

15 Claims, 9 Drawing Sheets

(51) Int. Cl.
   *H04N 9/67*     (2006.01)
   *H04N 9/64*     (2006.01)

(56)            References Cited

U.S. PATENT DOCUMENTS

| | | | |
|---|---|---|---|
| 10,074,029 B2* | 9/2018 | Tojo | G06K 9/4661 |
| 2003/0020736 A1* | 1/2003 | Kimura | H04N 9/73 |
| | | | 345/690 |
| 2004/0090536 A1* | 5/2004 | Tsai | H04N 9/735 |
| | | | 348/223.1 |
| 2007/0115518 A1* | 5/2007 | Shen | H04N 1/6058 |
| | | | 358/518 |
| 2009/0021647 A1* | 1/2009 | Choi | H04N 9/67 |
| | | | 348/655 |
| 2009/0167950 A1* | 7/2009 | Chen | H04N 5/58 |
| | | | 348/602 |
| 2009/0256928 A1* | 10/2009 | Noh | G01J 3/462 |
| | | | 348/223.1 |
| 2017/0162130 A1* | 6/2017 | Ghoshal | H05B 45/22 |

FOREIGN PATENT DOCUMENTS

| | | | |
|---|---|---|---|
| CN | 101505432 A | 8/2009 | |
| CN | 101605200 A | 12/2009 | |
| CN | 103546732 A | 1/2014 | |
| TW | 201501506 A | 1/2015 | |

* cited by examiner

COLOR CORRECTION METHOD AND DEVICE, AND COMPUTER-READABLE STORAGE MEDIUM THEREOF

CROSS-REFERENCE TO RELATED APPLICATION

The disclosure claims the benefits of priority to Chinese Application No. 201810099691.3, filed on Jan. 31, 2018, which is incorporated herein by reference in its entirety.

TECHNICAL FIELD

The present disclosure relates to the field of image processing technology, and more particularly to a color correction method and device, and computer-readable storage medium thereof.

BACKGROUND

In currently available technology, complementary metal oxide semiconductor (CMOS) sensors and the human eye differ in response to light of different wavelengths. As a result, color restoration provided by CMOS sensors for different colors in an image differs from the color restoration provided by the human eye for different colors in the image. An image in which neutral colors (black, white, gray) have been corrected using a white balance algorithm may still present color introduced by correction color patches. A method is needed to correct this issue.

In currently available technology, a color correction method is generally performed by photographing a standard color checker, calculating the average value of each color component for each color patch in the photographed image (i.e. the average values of the red component (R), the green component (G), and the blue component (B)), comparing the value with the standard value of the corresponding color patch on the standard color checker, and calculating a color correction matrix (CCM). Then, a matrix operation is performed on the RGB values for each pixel point in the input image to obtain the color corrected value for each color component (R', G', and B'). Color matrices are typically calculated using the method of least squares.

However, when color correction is performed in an RGB color space using a 3×3 color correction matrix with methods currently available, a calculated correction matrix applies the same correction coefficients to different color patches. Thus, color restoration with current methods has low accuracy due to the uniform application of the same coefficients.

SUMMARY

The present disclosure addresses the technical problem of improving color correction accuracy.

In accordance with the present disclosure, there is provided a color correction method which includes:
  obtaining an image to be corrected and a color temperature of the image, the image being in a YUV color space;
  determining first and second adjacent quadrants in a UV plane associated with each pixel point in the image according to a position of the pixel point on the UV plane; and
  performing color correction on each pixel point using correction matrices respectively corresponding to the first and second adjacent quadrants and the image color temperature, each correction matrix being calculated in advance of the color corrections according to the chrominance value of a color patch in each of the first and second quadrants, the color temperature, and a standard value corresponding to the color patch.

In accordance with the present disclosure, there is also provided a color correction device including:
  a processor; and
  a memory storage device storing instructions executable by the processor to:
    obtain an image to be corrected and a color temperature of the image, the image being in a YUV color space;
    determine first and second adjacent quadrants in a UV plane associated with each pixel point in the image according to a position of the pixel point on the UV plane; and
    perform color correction on each pixel point using correction matrices respectively corresponding to the first and second adjacent quadrants and the image color temperature, each correction matrix being calculated in advance of the color corrections according to the chrominance value of a color patch in each of the first and second quadrants, the color temperature, and a standard value corresponding to the color patch.

In accordance with the present disclosure, there is also provided a computer-readable storage medium on which a computer instruction is stored, and steps of the color correction method are executed when the computer instruction is run.

In accordance with the present disclosure, there is further provided a terminal including a storage device and a processor, and the storage device stores a computer instruction that can be run on the processor; the steps of the color correction method are executed when the computer instruction is run on the processor.

DETAILED DESCRIPTION

As described in the Background section above, when color correction is performed in an RGB color space using a 3×3 color correction matrix with methods currently available, a calculated correction matrix applies the same correction coefficients to different color patches. Thus, color restoration with current methods has low accuracy due to the uniform application of the same coefficients.

By using different correction matrices to perform correction on different pixel points on the UV plane, the technical solution provided by the present disclosure avoids issues caused by currently available technology which uses a single set of correction coefficients to correct all the color patches. This may better compensate for the difference between CMOS sensors and the human eye with respect to color restoration and improve color correction accuracy. Moreover, two adjacent quadrants associated with a pixel point on the UV plane are used when the correction is performed. This ensures chrominance continuity and color correction accuracy. Further, because the image to be corrected is in a YUV color space, the luma component Y need not be processed. Instead, only the U and V components are processed, which may reduce computational load and improve calibration efficiency.

In order to make the aforementioned purposes, characteristics, and advantages of the present disclosure more evident and easier to understand, detailed descriptions of specific example embodiments of the present disclosure are provided below with reference to the attached drawings.

Figure 1:
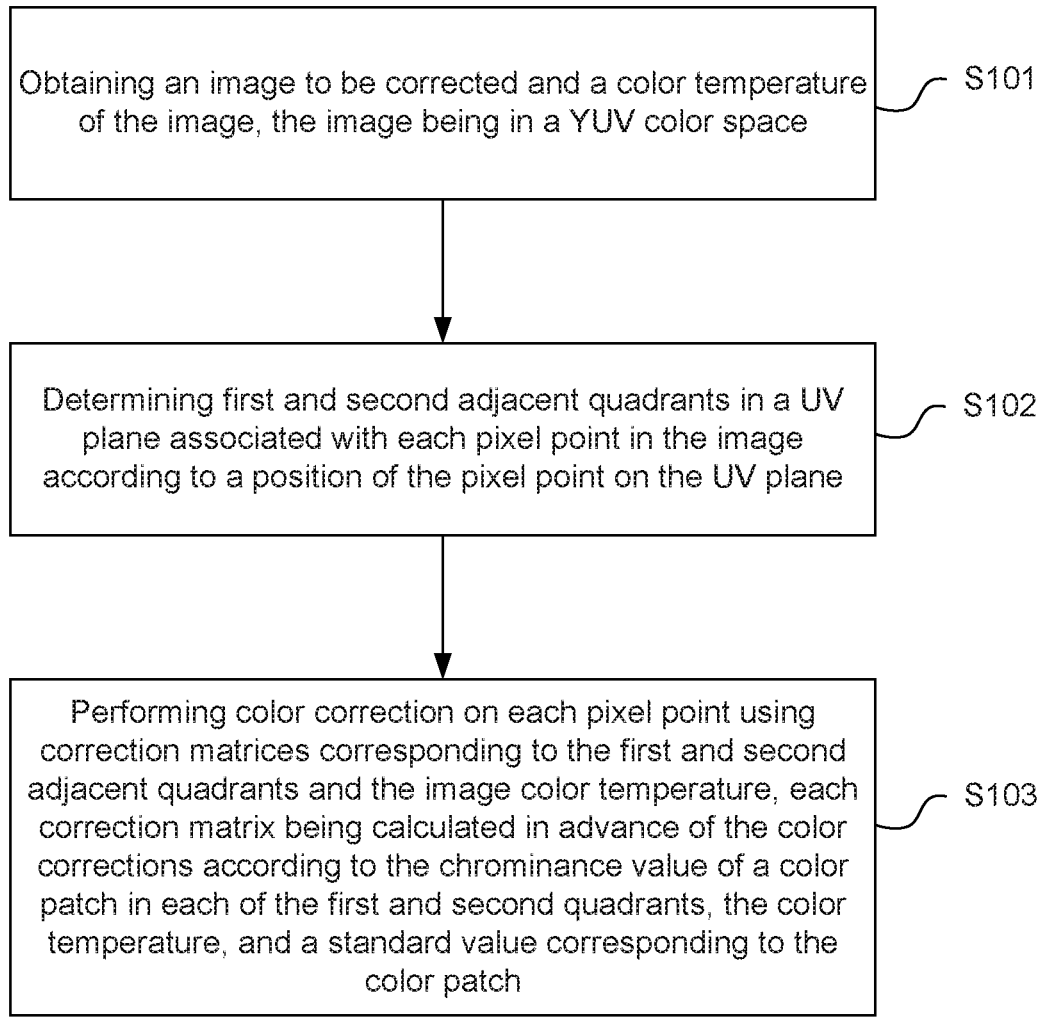
FIG. 1 is a flowchart illustrating a color correction method, according to an embodiment of the present disclosure.

FIG. 1 is a flowchart illustrating a color correction method according to an embodiment of the present disclosure.

The color correction method illustrated in FIG. 1 includes the following steps:

Step S101: obtaining an image to be corrected and a color temperature of the image, the image being in a YUV color space;

Step S102: determining first and second adjacent quadrants in a UV plane associated with each pixel point in the image according to a position of the pixel point on the UV plane; and Step S103: performing color correction on each pixel point using correction matrices corresponding to the first and second adjacent quadrants and the image color temperature, each correction matrix being calculated in advance of the color corrections according to the chrominance value of a color patch in each of the first and second quadrants, the color temperature, and a standard value corresponding to the color patch.

In one embodiment, the difference between a color patch and a standard color patch at different color temperatures varies. Therefore, different correction matrices need to be used when performing color correction on color patches at different color temperatures. Hence, in Step S101, in addition to obtaining an image to be corrected, the color temperature of the image is also obtained. Any implementable approach may be used to obtain the color temperature of the image to be corrected. No limitation in this respect is imposed by example embodiments of the present disclosure.

In one embodiment of the present disclosure, the image to be corrected is in a YUV color space. Specifically, if the image obtained is an RGB image, then the RGB image is converted to a YUV image. For example, in accordance with the BT.709 color space standard, the following matrix operation may be used to convert the RGB image to a YUV image:

$$\begin{bmatrix} Y \\ U \\ V \end{bmatrix} = \begin{bmatrix} 0.2126 & 0.7152 & 0.0722 \\ -0.09991 & -0.33609 & 0.436 \\ 0.615 & -0.55861 & -0.05639 \end{bmatrix} \begin{bmatrix} R \\ G \\ B \end{bmatrix}$$

The RGB image may also be converted to a YUV image in accordance with the BT.601 standard. Any other implementable approach may also be used to convert the RGB image to a YUV image. No limitation in this respect is imposed by example embodiments of the present disclosure.

Color correction in example embodiments of the present disclosure refers to correction performed with respect to the chrominance components of the image to be corrected, i.e., correction is performed on the U component and the V component. Thus, the luma component Y need not be processed. Instead, only the U and V components are processed, which may reduce the computational load and improve calibration efficiency.

The UV plane comprises two dimensions: a U component and a V component. In an embodiment of Step S102, the position of each pixel point on the UV plane is determined according to the U component and V component of the pixel point in the image to be corrected. The two adjacent quadrants associated with each pixel point are determined according to the position of the pixel point on the UV plane.

Figure 2:
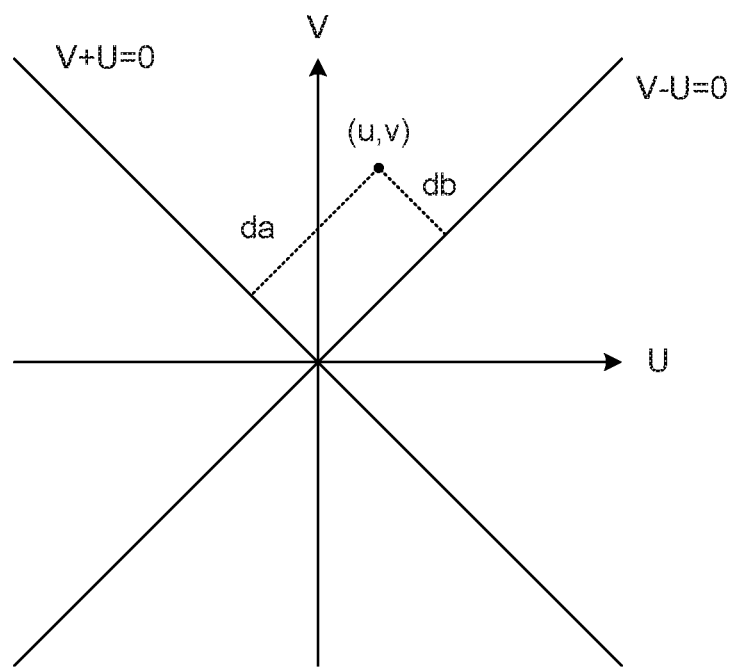
FIG. 2 is a diagram illustrating a relationship between each quadrant on a UV plane, according to an embodiment of the present disclosure.

The two adjacent quadrants associated with a pixel point comprise the quadrant in which the pixel point is located and a quadrant near the position of the pixel point on the UV plane. FIG. 2 is a diagram illustrating a relationship between each quadrant on a UV plane. Referring to FIG. 2, a pixel point (u, v) is located in the first quadrant. Clockwise, the quadrants are the first quadrant, the second quadrant, the third quadrant, and the fourth quadrant.

If the absolute values of both the U and the V values of the position coordinates of the pixel point are less than or equal to a preset value, then the pixel point is determined to be a neutral color. It is not necessary to color correct the pixel point, and it is not necessary to determine the first and second adjacent quadrants associated with the pixel point.

If the U value of the position coordinates of the pixel point is greater than the preset value and the absolute value of the V value of the color patch is less than or equal to the preset value, then the first and second adjacent quadrants associated with the pixel point are determined to be the first quadrant and the second quadrant. If the U value of the position coordinates of the pixel point is less than 0 and the absolute value is greater than the preset value, and the absolute value of the V value of the color patch is less than or equal to the preset value, then the two adjacent quadrants associated with the pixel point are determined to be the third quadrant and the fourth quadrant.

If the V value of the position coordinates of the pixel point is greater than the preset value and the absolute value of the U value of the color patch is less than or equal to the preset threshold, then the first and second adjacent quadrants associated with the pixel point are determined to be the first quadrant and the fourth quadrant. If the V value of the position coordinates of the pixel point is less than 0 and the absolute value is greater than the preset value, and the absolute value of the U value of the color patch is less than or equal to the preset threshold, then the first and second adjacent quadrants associated with the pixel point are determined to be the second quadrant and the third quadrant.

In another embodiment, the two adjacent quadrants associated with a pixel point may also be determined according to the relative positional relationship between the pixel point and the line V=U and the relative positional relationship between the pixel point and the line V=−U.

Continuing to refer to FIG. 2, suppose that Fa=(V+U>=0), Fb=(V−U>=0).

When Fa is true, the pixel point is located above the line V=−U; when Fa is false, the pixel point is located below the line V=−U.

When Fb is true, the pixel point is located above the line V=U; when Fb is false, the pixel point is located below the line V=U.

Then, when Fa is false and Fb is false, i.e., when the pixel point is located below the line V=−U and below the line V=U, the two adjacent quadrants associated with the pixel point are the second quadrant and the third quadrant.

When Fa is false and Fb is true, i.e., when the pixel point is located below the line V=−U and above the line V=U, the two adjacent quadrants associated with the pixel point are the third quadrant and the fourth quadrant.

When Fa is true and Fb is false, i.e., when the pixel point is located above the line V=−U and below the line V=U, the two adjacent quadrants associated with the pixel point are the first quadrant and the second quadrant.

When Fa is true and Fb is true, i.e., when the pixel point is located above the line V=−U and above the line V=U, the two adjacent quadrants associated with the pixel point are the first quadrant and the fourth quadrant.

With respect to the division of the first quadrant, the second quadrant, the third quadrant, and the fourth quadrant, any other implementable approach may be used to assign such division. No limitation in this respect is imposed by example embodiments of the present disclosure.

Each quadrant has different correction matrices for different color temperatures. The correction matrices corresponding to each quadrant for different color temperatures may be calculated and stored in advance of the correction. In Step S103, after the two adjacent quadrants associated with each pixel point have been determined, the correction matrices corresponding to the two adjacent quadrants associated with each pixel point and the color temperature may be used to color correct each pixel point.

Specifically, after weighting is performed on the correction matrices corresponding to the two adjacent quadrants and the color temperature, a matrix operation may be performed on the U component and V component of the pixel point to obtain a corrected U component and a corrected V component. In currently available technology, the following formula is generally used to color correct a pixel point:

$$\begin{bmatrix} R' \\ G' \\ B' \end{bmatrix} = CCM \times \begin{bmatrix} R \\ G \\ B \end{bmatrix},$$

$$CCM = \begin{bmatrix} C_{11} & C_{12} & C_{13} \\ C_{21} & C_{22} & C_{23} \\ C_{31} & C_{32} & C_{33} \end{bmatrix}$$

where the matrix $$\begin{bmatrix} R' \\ G' \\ B' \end{bmatrix}$$

represents the corrected red (R) component, blue (B) component, and green (G) component of the pixel point, the matrix $$\begin{bmatrix} C_{11} & C_{12} & C_{13} \\ C_{21} & C_{22} & C_{23} \\ C_{31} & C_{32} & C_{33} \end{bmatrix}$$

is the color correction matrix (CCM), and the matrix $$\begin{bmatrix} R \\ G \\ B \end{bmatrix}$$

represents the uncorrected R component, B component, G component of the pixel point.

Since the Y component of a pixel point represents information about the pixel point's luma, the present example embodiment does not process the Y component. The correction matrix applies to the U component and the V component, so the size of the correction matrix is 2×2. In comparison with the 3×3 matrix used in currently available technology, this may reduce the computational load and increase the efficiency of color correction.

By using different correction matrices to perform correction on different pixel points on the UV plane, the embodiment provided by the present disclosure avoids issues caused by currently available technology which uses a single set of correction coefficients to correct all the color patches. This may better compensate for the difference between CMOS sensors and the human eye with respect to color restoration and improve color correction accuracy. Moreover, two adjacent quadrants associated with a pixel point on the UV plane are used when the correction is performed. This ensures chrominance continuity and color correction accuracy.

The color correction steps illustrated in FIG. 1 may be executed in image signal processing (ISP) hardware. The correction matrix corresponding to each quadrant and each color temperature may be calculated in advance of the correction and written into the ISP hardware.

In one example embodiment of the present disclosure, Step S103 illustrated in FIG. 1 may include the following steps for each pixel point and image color temperature. First, a first product of the correction matrix corresponding to the first adjacent quadrant associated with the pixel point and the image color temperature, and a first preset coefficient is calculated. Second, a second product of the correction matrix corresponding to the second adjacent quadrant associated with the pixel point and the image color temperature, and a second preset coefficient is calculated. These two products are summed, and the sum is taken to be a final correction matrix for the pixel point. This final correction matrix for each pixel point is used to obtain a corrected image.

In the present example embodiment, a weighted sum is calculated from the two correction matrices corresponding to the two adjacent quadrants and the color temperature using the first preset coefficient and the second preset coefficient, respectively, to obtain the final correction matrix. The final correction matrix is used to color correct the pixel point. In other words, a matrix operation is performed with the final correction matrix on the U and V components to obtain the corrected U and V components of the pixel point.

In order to ensure continuity of the U components and the V components of the pixel points on the UV plane after correction has been performed on each pixel point using the two correction matrices corresponding to the two adjacent quadrants, the weight coefficients (i.e. the first preset coefficient and the second preset coefficient) need to be such that a sum of the first preset coefficient and the second preset coefficient is 1. When the first preset coefficient is 0, the pixel point is located on a line V=−U on the UV plane, and when the second preset coefficient is 0, the pixel point is located on a line V=U on the UV plane. Alternatively, when the first preset coefficient is 0, the pixel point is located on the line V=U, and when the second preset coefficient is 0, the pixel point is located on the line V=−U.

In other words, referring to FIG. 2, the line V=U is the center line traversing the first quadrant and the third quadrant, and the line V=−U is the center line traversing the second quadrant and the fourth quadrant. Color correction may be performed using the correction matrix corresponding to only a single quadrant when the pixel point is located on one of the two aforementioned lines, i.e., when the first preset coefficient or the second preset coefficient is 0. The first preset coefficient and the second preset coefficient may be values that have been set in advance of the correction, or they may also be values obtained by means of any implementable approach.

Figure 3:
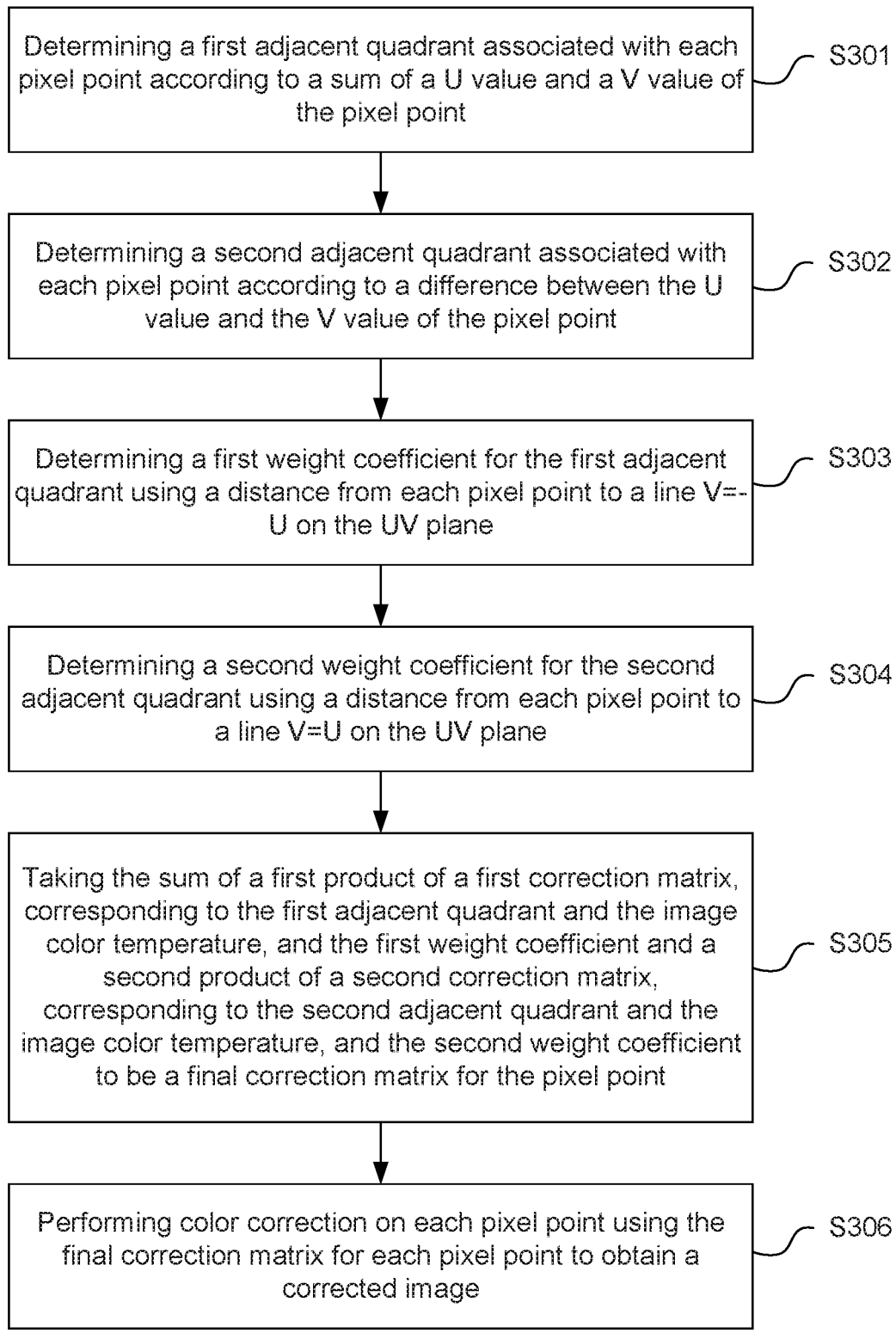
FIG. 3 is a partial flowchart illustrating a color correction method, according to an embodiment of the present disclosure.

Furthermore, FIG. 3 is a partial flowchart illustrating steps included in Steps S102 and S103 of FIG. 1:

Step S301: determining a first adjacent quadrant associated with each pixel point according to a sum of a U value and a V value of the pixel point;

Step S302: determining a second adjacent quadrant associated with each pixel point according to a difference between the U value and the V value of the pixel point;

Step S303: determining a first weight coefficient for the first adjacent quadrant using a distance from each pixel point to a line V=−U on the UV plane;

Step S304: determining a second weight coefficient for the second adjacent quadrant using a distance from each pixel point to a line V=U on the UV plane;

Step S305: taking the sum of a first product of a first correction matrix, corresponding to the first adjacent quadrant and the image color temperature, and the first weight coefficient and a second product of a second correction matrix, corresponding to the second adjacent quadrant and the image color temperature, and the second weight coefficient to be a final correction matrix for the pixel point; and Step S306: performing color correction on each pixel point using the final correction matrix for each pixel point to obtain a corrected image.

In Step S301 and Step S302, the two adjacent quadrants associated with the pixel point may be determined with reference to FIG. 2. Specifically, when a sum of a U value and a V value of the pixel point is greater than or equal to 0, the first adjacent quadrant is the first quadrant. When the sum of the U value and the V value of the pixel point is less than 0, the first adjacent quadrant is the third quadrant. When a difference between the U value and the V value of the pixel point is greater than or equal to 0, the second adjacent quadrant is the fourth quadrant. When the difference between the U value and the V value of the pixel point is less than 0, the second adjacent quadrant is the second quadrant.

In Step S303 and Step S304, a distance from the pixel point to a line V=U in the UV plane and a distance from the pixel point to a line V=−U in the UV plane may be used to determine a first weight coefficient and a second weight coefficient, respectively. Here, the first weight coefficient is used to perform weighting on the correction matrix corresponding to the first adjacent quadrant, and the second weight coefficient is used to perform weighting on the correction matrix corresponding to the second adjacent quadrant.

Further, a sum of the first weight coefficient and the second weight coefficient is 1.

Specifically, referring to FIG. 2, the distance from the pixel point (u, v) to the line V=−U is da, and the distance from the pixel point (u, v) to the line V=U is db. Here, da=|u+v|; db=|u−v|. The first weight coefficient is designated α and is calculated using the distance da; the second weight coefficient is designated β and is calculated using the distance db.

The following formulas may be used to calculate the first weight coefficient α and the second weight coefficient β:

$$\alpha = \frac{da}{da+db} = \frac{|u+v|}{|u+v|+|u-v|};$$

$$\beta = \frac{db}{da+db} = \frac{|u-v|}{|u+v|+|u-v|}.$$

By interpolating the final correction matrix for the pixel point from the correction matrices corresponding to the adjacent quadrants according to a pixel point's position on the UV plane, this example embodiment of the present disclosure prevents abrupt color change and distortion caused by abrupt change in the correction matrices when the pixel point is close to a quadrant's boundary, thereby further ensuring color correction accuracy.

Any other implementable algorithm may be used to calculate the first weight coefficient α and the second weight coefficient β, as long as it is ensured that the first weight coefficient α and the second weight coefficient β change continuously with no abrupt change when the pixel point moves on the UV plane.

Figure 4:
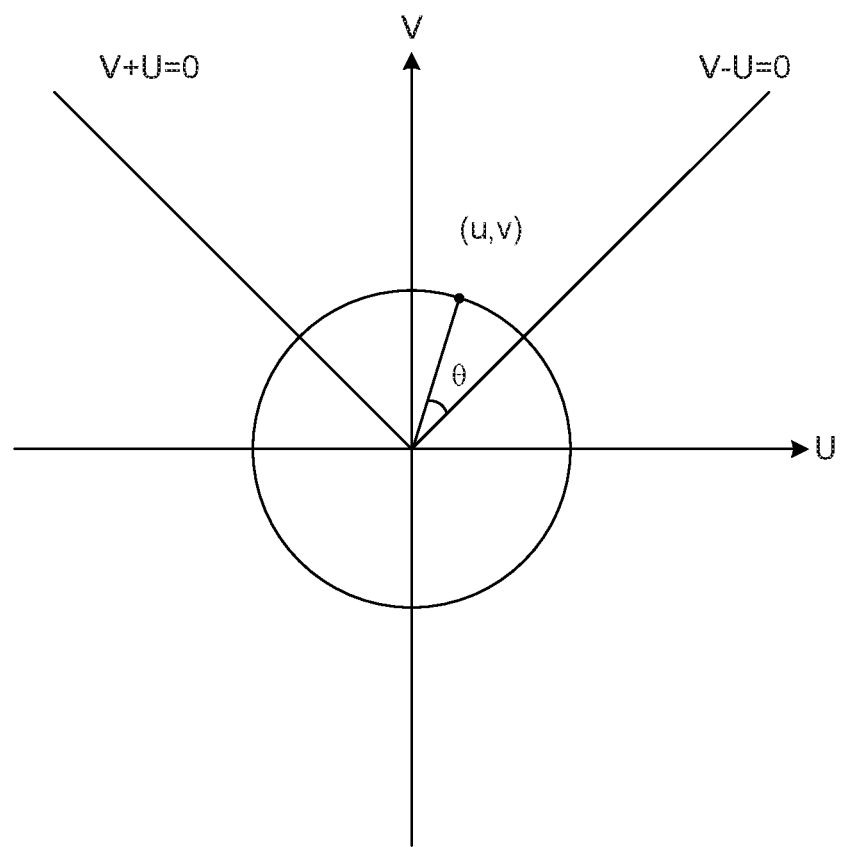
FIG. 4 is a diagram illustrating a specific application scenario, according to an embodiment of the present disclosure.

FIG. 4 is a diagram illustrating a specific application scenario, according to an embodiment of the present disclosure. More particularly, FIG. 4 illustrates that an angle θ between the line formed by the pixel point and the origin and the line V=U may be used to calculate the first weight coefficient α and the second weight coefficient β. Specifically, the following formulas may be used to calculate the first weight coefficient α and the second weight coefficient β:

$$\alpha = \frac{\theta}{\pi/2} = \frac{\arctan(u/v) - \pi/4}{\pi/2} = \frac{2\arctan(u/v)}{\pi} - 1/2;$$

$$\beta = 1 - \alpha.$$

Figure 5:
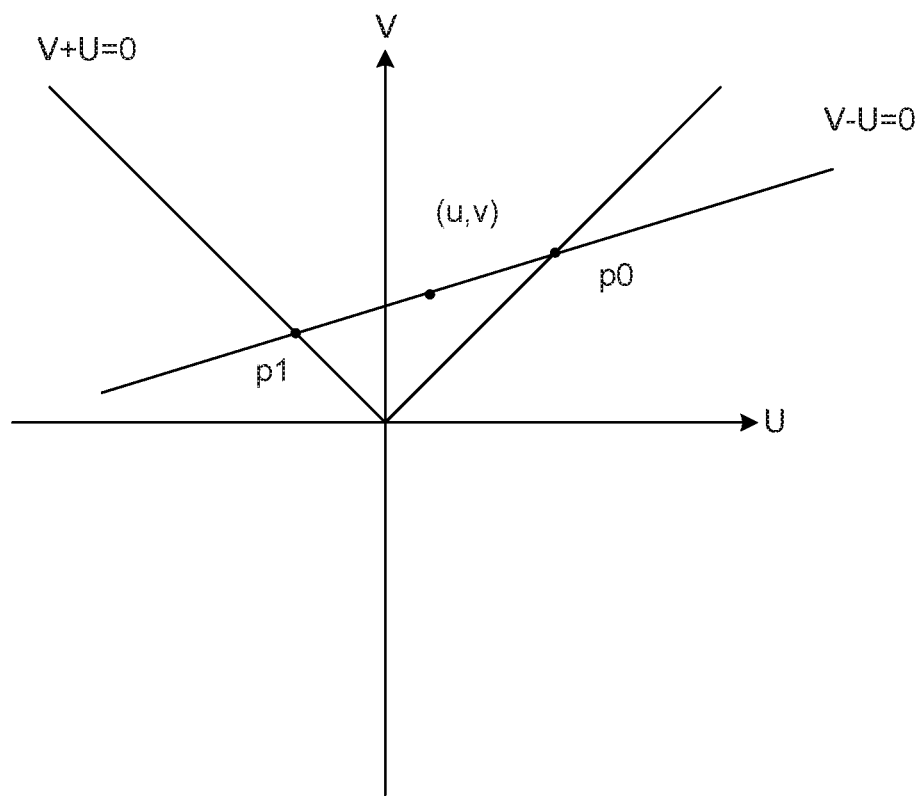
FIG. 5 is a diagram illustrating another specific application scenario, according to an embodiment of the present disclosure.

FIG. 5 is a diagram illustrating another specific application scenario, according to an embodiment of the present disclosure. More particularly, FIG. 5 illustrates that any line on which the pixel point is located intersects the lines V=U and V=−U at two points, and the distances between the two points of intersection and the pixel point on the horizontal axis (i.e., the line V=0) or vertical axis (i.e., the line U=0) may be used to calculate the first weight coefficient α and the second weight coefficient β. Specifically, the line on which the pixel point is located is V−v=k(U−u), k≠±1. A description is provided below using k=½ as an example.

The point of intersection of the line V−v=½(U−u) on which the pixel point p(u, v) is located and the line V=U is p0(2v−u, 2v−u). The point of intersection of the line V−v=½(U−u) on which the pixel point (u, v) is located and the line V=−U is p1((u−v)/3, (v−u)/3).

The following formulas may be used to calculate the first weight coefficient α and the second weight coefficient β:

$$\alpha = \frac{(p_0 - p)}{(p_0 - p_1)} = \frac{2v - u - u}{2v - u - (u - v)/3} = \frac{6v - 6u}{7v - 4u};$$

$$\beta = \frac{(p - p_1)}{(p_0 - p_1)} = \frac{u - (u - v)/3}{2v - u - (u - v)/3} = \frac{2u + v}{7v - 4u}.$$

Here, $\alpha + \beta = (6v - 6u)/(7v - 4u) + (2u + v)/(7v - 4u) = 1$.

Continuing to refer to FIG. 3, after the first adjacent quadrant, the second adjacent quadrant, the first weight coefficient, and the second weight coefficient are determined, the first correction matrix corresponding to the first adjacent quadrant and the color temperature and the second correction matrix corresponding to the second adjacent quadrant and the color temperature may be determined. Then, in one embodiment of Step S305 and Step S306, weighting is performed on the first correction matrix using the first weight coefficient, and on the second correction matrix using the second weight coefficient to obtain the final correction matrix. The final correction matrix is a 2×2 matrix. As such, after a matrix operation is performed on the U component and V component of the pixel point using the final correction matrix, the corrected U component and V component may be obtained.

Specifically, the final correction matrix C may be expressed as $$C = \begin{cases} Ca, (u - v = 0) \\ Cb, (u + v = 0) \\ \alpha Ca + \beta Cb, u - v \neq 0 \text{ and } u + v \neq 0 \end{cases}$$

where Ca represents the first adjacent quadrant matrix, Cb represents the second adjacent quadrant matrix, α is the first weight coefficient, and β is the second weight coefficient.

The formula to correct the U component and V component of the pixel point using the final correction matrix C may be expressed as follows:

$$\begin{bmatrix} U' \\ V' \end{bmatrix} = C \times \begin{bmatrix} U \\ V \end{bmatrix} = \begin{bmatrix} C11 & C12 \\ C21 & C22 \end{bmatrix} \times \begin{bmatrix} U \\ V \end{bmatrix}$$

where, $$\begin{bmatrix} U' \\ V' \end{bmatrix}$$

represents the corrected U component and V component, $$\begin{bmatrix} U \\ V \end{bmatrix}$$

represents the uncorrected U component and V component, and $$\begin{bmatrix} C11 & C12 \\ C21 & C22 \end{bmatrix}$$

represents the specific parameters of the final correction matrix.

By interpolating using the first weight coefficient and the second weight coefficient, this embodiment of the present disclosure may, when color correction is performed on pixel points within a relatively large color patch, cause the corrected color transition to be smoother and free of abrupt change and false color.

Figure 6:
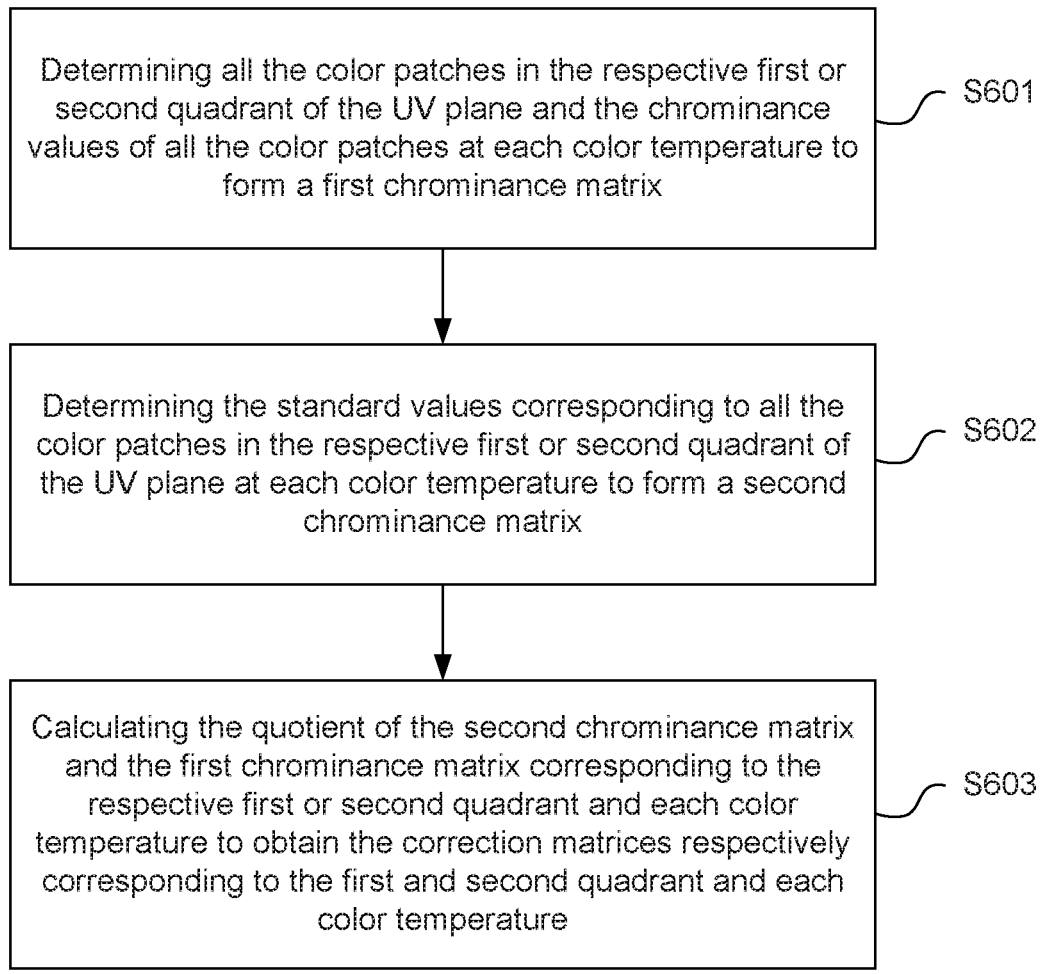
FIG. 6 is a flowchart illustrating a method for determining a correction matrix, according to an embodiment of the present disclosure.

FIG. 6 is a flowchart illustrating a method for determining the correction matrix, according to an embodiment of the present disclosure. The method includes the following steps:

Step S601: determining all the color patches in the respective first or second quadrant of the UV plane and the chrominance values of all the color patches at each color temperature to form a first chrominance matrix;

Step S602: determining the standard values corresponding to all the color patches in the respective first or second quadrant of the UV plane at each color temperature to form a second chrominance matrix; and Step S603: calculating the quotient of the second chrominance matrix and the first chrominance matrix corresponding to the respective first or second quadrant and each color temperature to obtain the correction matrices respectively corresponding to the first and second quadrant and each color temperature.

In the present embodiment, the correction matrix corresponding to each quadrant and each color temperature may be calculated and stored prior to the color correction illustrated in FIG. 1 so that they may be retrieved and used during the color correction process. A color patch refers to a patch of color in a color checker image obtained by photographing a standard color checker.

In one specific embodiment, before the first chrominance matrix is determined, white balance adjustment may be performed on the color checker image to prevent the chrominance from being affected by the color temperature. Specifically, the following formula may be used to perform white balance on the color checker image:

$$\begin{bmatrix} R \\ G \\ B \end{bmatrix} = \begin{bmatrix} GainR & 0 & 0 \\ 0 & 1 & 0 \\ 0 & 0 & GainB \end{bmatrix} \begin{bmatrix} R0 \\ G0 \\ B0 \end{bmatrix}$$

where the matrix $$\begin{bmatrix} R \\ G \\ B \end{bmatrix}$$

represents the white-balanced R component, G component, and B component; the matrix $$\begin{bmatrix} R0 \\ G0 \\ B0 \end{bmatrix}$$

represents the non-white-balanced R component, G component, and B component; and the matrix $$\begin{bmatrix} GainR & 0 & 0 \\ 0 & 1 & 0 \\ 0 & 0 & GainB \end{bmatrix}$$

represents a gain matrix in which GainR and GainB are the gain values at which the average color cast of the neutral color patches numbered 20 to 23 on a standard color checker (a standard color checker comprises color patches numbered 1 to 24) is minimized.

Any other implementable algorithm may be used to perform the white balance, and no limitation in this respect is imposed by example embodiments of the present disclosure.

After undergoing white balance, the color checker image is in a YUV color space. In other words, if the color checker image is an RGB image, then the RGB image needs to be converted to a YUV image.

In one embodiment of Step S601, each color patch is assigned to a quadrant on the UV plane according to the chrominance value (i.e., the U component and V component) of each color patch. Thus, all the color patches in each quadrant may be determined. The first chrominance matrix corresponding to each quadrant and each color temperature is formed by the U components and V components of all the color patches in the quadrant and each color temperature.

In one embodiment of Step S602, the standard values corresponding to all the color patches in each quadrant and each color temperature are used to form the second chrominance matrix for the quadrant and each color temperature.

Then, in Step S603, the quotient of the second chrominance matrix and the first chrominance matrix corresponding to each quadrant is calculated at each color temperature to obtain the correction matrix corresponding to each quadrant and each color temperature.

Specifically, the following formula may be used to calculate the correction matrix corresponding to a quadrant and a specific color temperature:

$$\begin{bmatrix} Ustd1 & Ustd2 & \ldots & Ustdn \\ Vstd1 & Vstd2 & & Vstdn \end{bmatrix} = \begin{bmatrix} C11 & C12 \\ C21 & C22 \end{bmatrix} \times \begin{bmatrix} U1 & U2 & \ldots & Un \\ V1 & V2 & & Vn \end{bmatrix}$$

where the matrix $$\begin{bmatrix} Ustd1 & Ustd2 & \ldots & Ustdn \\ Vstd1 & Vstd2 & & Vstdn \end{bmatrix}$$

is the second chrominance matrix corresponding to the quadrant and the specific color temperature, the matrix $$\begin{bmatrix} U1 & U2 & \ldots & Un \\ V1 & V2 & & Vn \end{bmatrix}$$

is the first chrominance matrix corresponding to the quadrant and the specific color temperature, and the matrix $$\begin{bmatrix} C11 & C12 \\ C21 & C22 \end{bmatrix}$$

is the correction matrix corresponding to the quadrant and the specific color temperature.

The aforementioned formula may be used to calculate the correction matrices corresponding to the four quadrants on the UV plane and each color temperature. More specifically, the method of least squares may be used to solve the aforementioned correction matrices.

Thus, each quadrant has a plurality of correction matrices, each of which corresponds to a different color temperature. Color temperature may be divided into categories using any implementable approach. For example, it may be divided into three categories: high color temperature, medium color temperature, and low color temperature. It may also be divided into more categories according to different ranges of color temperatures. No limitation in this respect is imposed by example embodiments of the present disclosure.

Further, the first or second quadrant in which a color patch is located may be determined using the following method:
   if both the U value and V value of the color patch are less than or equal to a preset threshold, then the color patch is determined to be a neutral color patch and is not added to any quadrant;
   if the U value of the color patch is greater than the preset threshold and the V value of the color patch is less than or equal to the preset threshold, then the color patch is added to the first and second adjacent quadrants according to the U value of the color patch; and
   if the V value of the color patch is greater than the preset threshold and the U value of the color patch is less than or equal to the preset threshold, then the color patch is added to the first and second adjacent quadrants according to the V value of the color patch.

This example is a specific embodiment of Step S601 illustrated in FIG. 6, and may determine all the color patches in each quadrant. The U value of the color patch may be the average value of the U component values of all the pixel points in the color patch, and the V value of the color patch may be the average value of the V component values of all the pixel points in the color patch.

Specifically, if both the U value and V value of a given color patch are less than or equal to the preset threshold, then the color patch is determined to be a neutral color and is not added to any quadrant. If the absolute value of one of the U value and V value of a given color patch is less than or equal to the preset threshold, then the color patch is determined to be simultaneously located in two quadrants and is simultaneously added to the two quadrants.

For example, if the U value and V value of a color patch 1 are U=−63, V=1; V is less than the preset threshold, so the color patch 1 is determined according to the U value to be in the third quadrant and the fourth quadrant. If the U value and V value of a color patch 2 are U=2, V=−1; both values are less than the preset threshold, so the color patch 2 is determined to be a neutral color and is not processed further.

Figure 7:
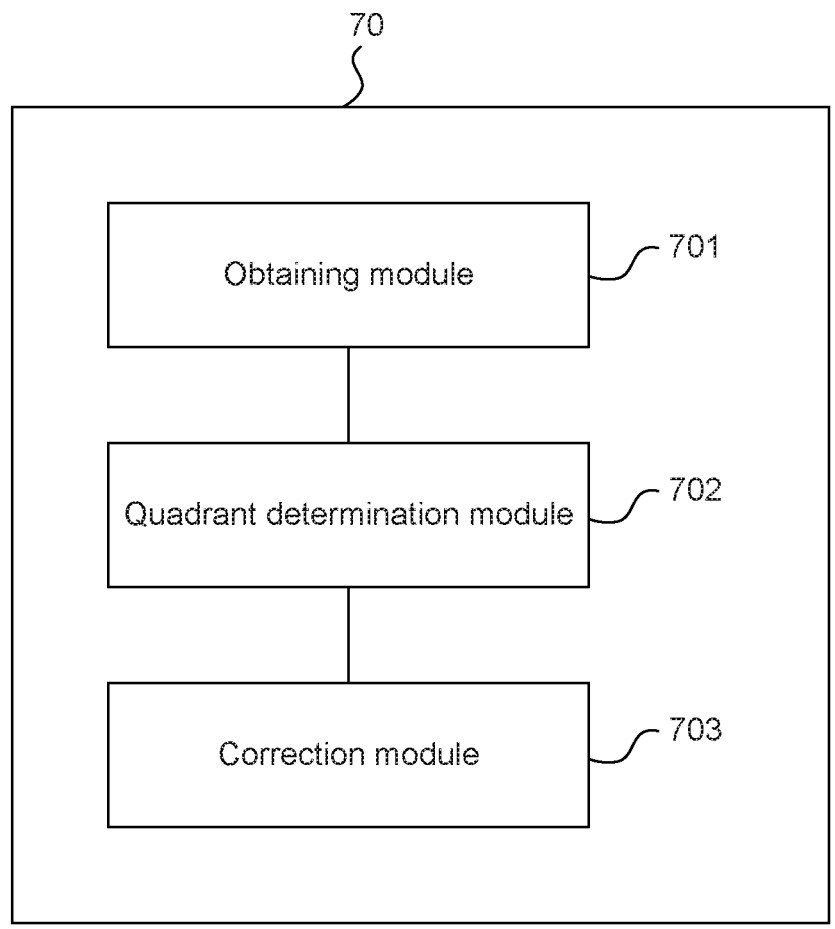
FIG. 7 is a structural diagram illustrating a color correction device, according to an embodiment of the present disclosure.

FIG. 7 is a structural diagram illustrating another specific application scenario, according to an embodiment of the present disclosure. More particularly, as illustrated in FIG. 7, a color correction device 70 includes an obtaining module 701, a quadrant determination module 702, and a correction module 703.

Here, the obtaining module 701 is adapted to obtain an image to be corrected and a color temperature of the image, the image being in a YUV color space. The quadrant determination module 702 is adapted to determine first and second adjacent quadrants in the UV plane associated with each pixel point in the image according to a position of the pixel point on the UV plane. The correction module 703 is adapted to perform color correction on each pixel point using correction matrices respectively corresponding to the first and second adjacent quadrants and the image color temperature. Each correction matrix is calculated in advance of the color correction according to the chrominance value of a color patch in each of the first and second quadrants, the color temperature, and a standard value corresponding to the color patch.

By using different correction matrices to perform correction on different pixel points on the UV plane, this example embodiment avoids issues caused by currently available technology which uses a single set of correction coefficients to correct all the color patches. This may better compensate for the difference between CMOS sensors and the human eye with respect to color restoration and improve color correction accuracy. Moreover, two adjacent quadrants associated with a pixel point on the UV plane are used when the correction is performed. This ensures chrominance continuity and color correction accuracy. Further, because the image to be corrected is in a YUV color space, the luma component Y need not be processed. Instead, only the U and V components are processed, which may reduce the computational load and improve calibration efficiency.

In one embodiment of the present disclosure, the correction module 703 may comprise a first calculation unit (not shown in the figure) adapted to calculate a final correction matrix for each pixel point and image color temperature. The module first calculates a first product of the correction matrix corresponding to the first adjacent quadrant associated with the pixel point and the image color temperature, and a first preset coefficient. The module then calculates a second product of the correction matrix, corresponding to the second adjacent quadrant associate with the pixel point and the image color temperature, and a second preset coefficient. The module sums the two products to calculate a final correction matrix for the pixel point. The correction module 703 may also comprise a first correction unit (not shown in the figure) adapted to perform color correction on each pixel point using the final correction matrix for each pixel point to obtain a corrected image. In this embodiment, a weighted sum is calculated from the two correction matrices corresponding to the two adjacent quadrants and the color temperature using the first preset coefficient and the second preset coefficient, respectively, to obtain the final correction matrix. The final correction matrix is used to color correct the pixel point. In other words, a matrix operation is performed with the final correction matrix on the U and V components to obtain the corrected U and V components of the pixel point.

In order to ensure continuity of the U components and the V components of the pixel points on the UV plane after correction has been performed on each pixel point using the two correction matrices corresponding to the two adjacent quadrants, the weight coefficients (i.e., the first preset coefficient and the second preset coefficient) need to be such that a sum of the first preset coefficient and the second preset coefficient is 1. When the first preset coefficient is 0, the pixel point is located on the line V=−U on the UV plane, and when the second preset coefficient is 0, the pixel point is located on the line V=U on the UV plane. Alternatively, when the first preset coefficient is 0, the pixel point is located on the line V=U on the UV plane, and when the second preset coefficient is 0, the pixel point is located on the line V=−U on the UV plane.

Figure 8:
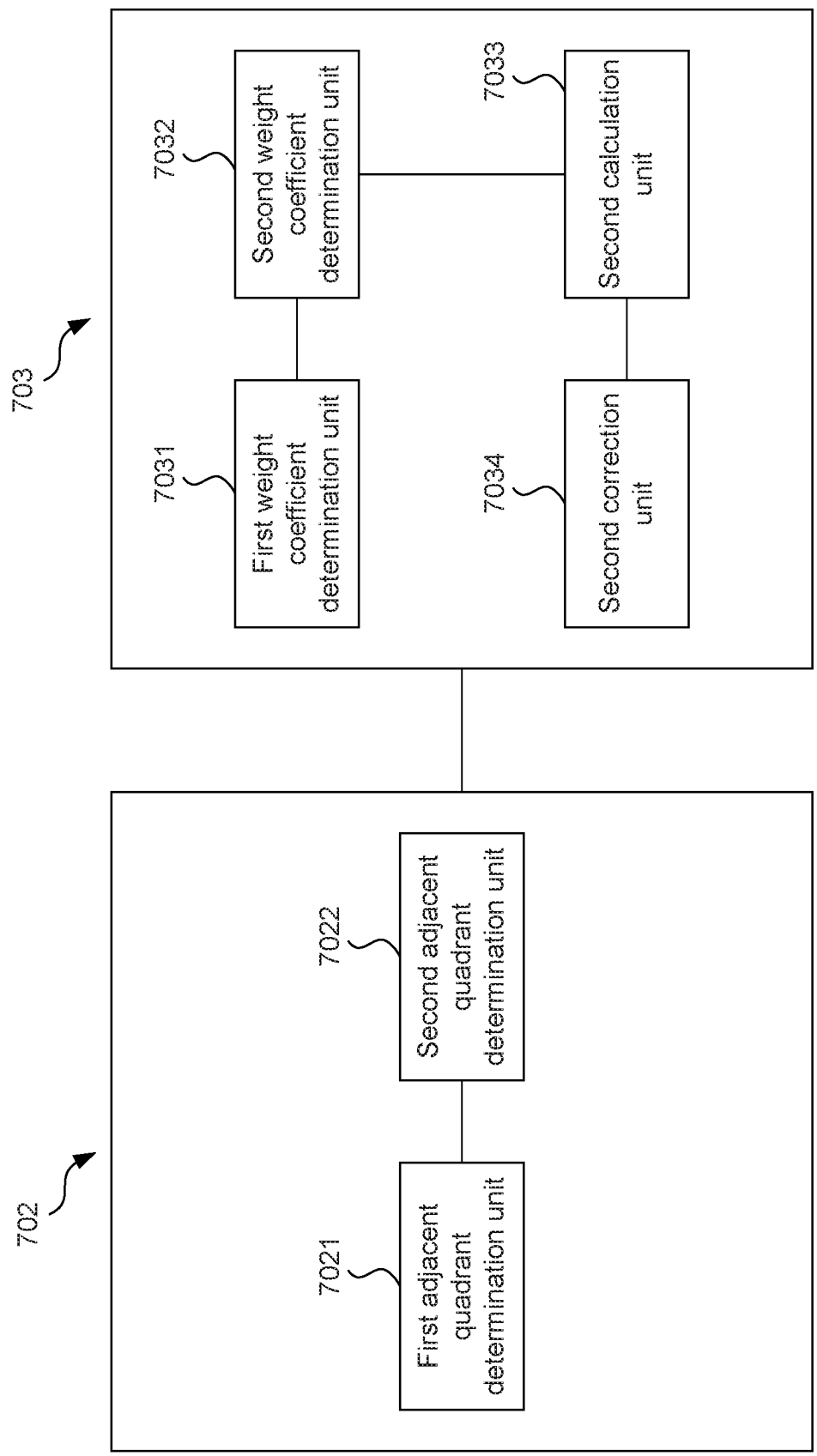
FIG. 8 is a partial structural diagram illustrating a color correction device, according to an embodiment of the present disclosure.

FIG. 8 is a partial structural diagram illustrating another specific application scenario, according to an embodiment of the present disclosure. More particularly, FIG. 8 shows that the quadrant determination module 702 illustrated in FIG. 7 may include the following components:

a first adjacent quadrant determination unit 7021 adapted to determine the first adjacent quadrant associated with each pixel point according to a sum of a U value and a V value of the pixel point; and a second adjacent quadrant determination unit 7022 adapted to determine the second adjacent quadrant associated with each pixel point according to a difference between the U value and the V value of the pixel point.

FIG. 8 further illustrates that the correction module 703 of FIG. 7 may also include:

a first weight coefficient determination unit 7031 adapted to determine a first weight coefficient for the first adjacent quadrant using a distance from each pixel point to a line V=−U on the UV plane;

a second weight coefficient determination unit 7032 adapted to determine a second weight coefficient for the second adjacent quadrant using a distance from each pixel point to a line V=U on the UV plane;

a second calculation unit 7033 adapted to take a sum of a first product of a first correction matrix corresponding to the first adjacent quadrant and the image color temperature, and the first weight coefficient and a second product of a second correction matrix corresponding to the second adjacent quadrant and the image color temperature, and the second weight coefficient to be a final correction matrix for the pixel point; and a second correction unit 7034 adapted to perform color correction on each pixel point using the final correction matrix for each pixel point to obtain a corrected image.

A sum of the first weight coefficient and the second weight coefficient is 1. By interpolating the final correction matrix for the pixel point from the correction matrices corresponding to the adjacent quadrants according to a pixel point's position on the UV plane, this example embodiment of the present disclosure prevents abrupt color change and distortion caused by abrupt change in the correction matrices when the pixel point is close to a quadrant's boundary, thereby further ensuring color correction accuracy.

Figure 9:
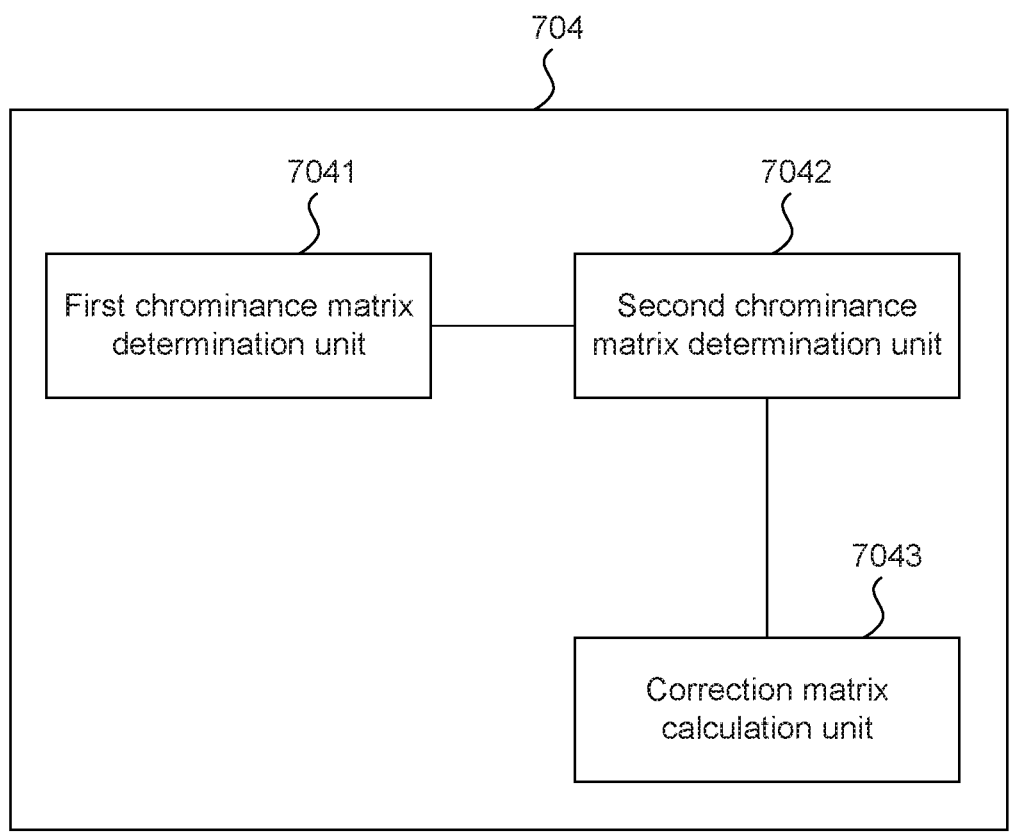
FIG. 9 is a partial structural diagram illustrating another color correction device, according to an embodiment of the present disclosure.

FIG. 9 is a partial structural diagram illustrating another specific application scenario, according to an embodiment of the present disclosure. More particularly, FIG. 9 further illustrates that the color correction device 70 of FIG. 7 may also include a correction matrix obtaining module 704 adapted to calculate the correction matrices respectively corresponding to the first and second quadrants and each color temperature. The correction matrix obtaining module 704 may comprise:

a first chrominance matrix determination unit 7041 adapted to determine all the color patches in the respective first or second quadrant of the UV plane and the chrominance values of all the color patches at each color temperature to form a first chrominance matrix;

a second chrominance matrix determination unit 7042 adapted to determine the standard values corresponding to all the color patches in the respective first or second quadrant of the UV plane at each color temperature to form a second chrominance matrix; and a correction matrix calculation unit 7043 adapted to calculate the quotient of the second chrominance matrix and the first chrominance matrix corresponding to the respective first or second quadrant and each color temperature to obtain the correction matrices respectively corresponding to the first and second quadrants and each color temperature.

Each quadrant has a plurality of correction matrices, each of which corresponds to a different color temperature. Color temperature may be divided into categories using any implementable approach. For example, it may be divided into high color temperature, medium color temperature, and low color temperature. No limitation in this respect is imposed by example embodiments of the present disclosure.

In one embodiment of the present disclosure, the first chrominance matrix determination unit 7041 may comprise a first quadrant assessment unit (not shown in the figure) adapted to determine a color patch to be a neutral color and not add the color patch to any quadrant if both the U value and V value of a color patch are less than or equal to a preset threshold. A second quadrant assessment unit (not shown in the figure) adds a color patch to the first and second adjacent quadrants according to the U value of the color patch if the U value of the color patch is greater than the preset threshold and the V value of the color patch is less than or equal to the preset threshold. A third quadrant assessment unit (not shown in the figure) adds the color patch to the first and second adjacent quadrants according to the V value of the color patch if the V value of the color patch is greater than the preset threshold and the U value of the color patch is less than or equal to the preset threshold. This example embodiment of the present disclosure may be used to determine all the color patches in each quadrant.

One example embodiment of the present disclosure is a computer-readable storage medium on which a computer instructions are stored. The steps of the color correction method illustrated in FIG. 1 through FIG. 6 may be performed when the computer instructions are executed by a processor. The storage medium may comprise a ROM, a RAM, a magnetic disk, or an optical disc, etc. The storage medium may further comprise a non-volatile storage device or a non-transitory storage device, etc.

Another embodiment of the present disclosure is a terminal comprising a storage device and a processor. The storage device stores computer instructions that may be run on the processor. The steps of the color correction method illustrated in FIG. 1 through FIG. 6 may be performed when the processor executes the computer instructions. The terminal may be, but is not limited to, a cell phone, a computer, a tablet, or another terminal device.

In comparison with currently available technology, the technical solution provided by example embodiments of the present disclosure has a number of benefits.

In the technical solution provided by the present disclosure, an image to be corrected and the color temperature of the image are obtained. The image is in a YUV color space. Two adjacent quadrants associated with each pixel point are determined according to the position of the pixel point on the UV plane, and color correction is performed on each pixel point using correction matrices corresponding to the two adjacent quadrants associated with each pixel point and the image color temperature. The correction matrix, corresponding to a quadrant and a color temperature, is calculated in advance of the correction according to the chrominance value of a color patch in each quadrant and the color temperature, as well as the standard value corresponding to the color patch.

By using different correction matrices to perform correction on different pixel points on the UV plane, the present disclosure avoids issues caused by currently available technology which uses a single set of correction coefficients to correct all the color patches. This may better compensate for the difference between CMOS sensors and the human eye with respect to color restoration and improve color correction accuracy. Moreover, two adjacent quadrants associated with a pixel point on the UV plane are used when the correction is performed. This ensures chrominance continuity and color correction accuracy. Further, because the image to be corrected is in a YUV color space, the luma component Y need not be processed. Instead, only the U and V components are processed, which may reduce the computational load and improve calibration efficiency.

Further, by interpolating the final correction matrix for the pixel point from the correction matrices corresponding to the adjacent quadrants according to a pixel point's position on the UV plane, the present disclosure prevents abrupt color change and distortion caused by abrupt change in the correction matrices when the pixel point is close to a quadrant's boundary, thereby further ensuring color correction accuracy.

Notwithstanding the above disclosure, the present claims are not limited thereby. Any person having ordinary skill in the art may make various alterations and changes that are not detached from the essence and scope of the disclosed embodiments; therefore, the scope of protection for the present disclosure should be that as defined by the claims.

What is claimed is:

1. A color correction method, comprising:
    obtaining an image to be corrected and a color temperature of the image, the image being in a YUV color space;
    determining first and second adjacent quadrants in a UV plane associated with each pixel point in the image according to a position of the pixel point on the UV plane; and
    performing color correction on each pixel point using correction matrices respectively corresponding to the first and second adjacent quadrants and the image color temperature, each correction matrix being calculated in advance of the color corrections according to the chrominance value of a color patch in each of the first and second quadrants, the color temperature, and a standard value corresponding to the color patch.

2. The color correction method of claim 1, wherein performing the color correction on each pixel point comprises:
    calculating a first product of the correction matrix corresponding to the first adjacent quadrant associated with the pixel point and the image color temperature, and a first preset coefficient;
    calculating a second product of the correction matrix corresponding to the second adjacent quadrant associated with the pixel point and the image color temperature, and a second preset coefficient;
    taking a sum of the first and second products to be a final correction matrix for the pixel point; and performing color correction on each pixel point using the final correction matrix for each pixel point to obtain a corrected image.

3. The color correction method of claim 2, wherein:
a sum of the first preset coefficient and the second preset coefficient is 1;
when the first preset coefficient is 0, the pixel point is located on a line V=−U on the UV plane; and
when the second preset coefficient is 0, the pixel point is located on a line V=U on the UV plane.

4. The color correction method of claim 1, wherein determining the first and second adjacent quadrants comprises:
    determining the first adjacent quadrant associated with each pixel point according to a sum of a U value and a V value of the pixel point;
    determining the second adjacent quadrant associated with each pixel point according to a difference between the U value and the V value of the pixel point; and
performing the color correction comprises:
    determining a first weight coefficient for the first adjacent quadrant using a distance from each pixel point to a line V=−U on the UV plane;
    determining a second weight coefficient for the second adjacent quadrant using a distance from each pixel point to a line V=U on the UV plane;
    taking a sum of a first product of a first correction matrix, corresponding to the first adjacent quadrant and the image color temperature, and the first weight coefficient and a second product of a second correction matrix, corresponding to the second adjacent quadrant and the image color temperature, and the second weight coefficient to be a final correction matrix for the pixel point; and
    performing color correction on each pixel point using the final correction matrix for each pixel point to obtain a corrected image.

5. The color correction method of claim 4, wherein a sum of the first weight coefficient and the second weight coefficient is 1.

6. The color correction method of claim 1, wherein each of the correction matrices respectively corresponding to the first and second quadrants and each color temperature is calculated by:
    determining all the color patches in the respective first or second quadrant of the UV plane and the chrominance values of all the color patches at each color temperature to form a first chrominance matrix;
    determining the standard values corresponding to all the color patches in the respective first or second quadrant of the UV plane at each color temperature to form a second chrominance matrix; and
    calculating the quotient of the second chrominance matrix and the first chrominance matrix corresponding to the respective first or second quadrant and each color temperature to obtain the correction matrices respectively corresponding to the first and second quadrants and each color temperature.

7. The color correction method of claim 6, wherein the first or second quadrant in which a color patch is located is determined using the following method:
    if both the U value and V value of the color patch are less than or equal to a preset threshold, then the color patch is determined to be a neutral color patch and is not added to any quadrant;
    if the U value of the color patch is greater than the preset threshold and the V value of the color patch is less than or equal to the preset threshold, then the color patch is added to the first and second adjacent quadrants according to the U value of the color patch; and
    if the V value of the color patch is greater than the preset threshold and the U value of the color patch is less than or equal to the preset threshold, then the color patch is added to the first and second adjacent quadrants according to the V value of the color patch.

8. A color correction device comprising:
a processor; and
a memory storage device storing instructions executable by the processor to:
    obtain an image to be corrected and a color temperature of the image, the image being in a YUV color space;
    determine first and second adjacent quadrants in a UV plane associated with each pixel point in the image according to a position of the pixel point on the UV plane; and
    perform color correction on each pixel point using correction matrices respectively corresponding to the first and second adjacent quadrants and the image color temperature, each correction matrix being calculated in advance of the color corrections according to the chrominance value of a color patch in each of the first and second quadrants, the color temperature, and a standard value corresponding to the color patch.

9. The color correction device of claim 8, wherein performing color correction on each pixel point comprises:
calculating
    a first product of the correction matrix corresponding the first adjacent quadrant associated with the pixel point and the image color temperature, and a first preset coefficient;
    a second product of the correction matrix corresponding to the second adjacent quadrant associated with the pixel point and the image color temperature, and a second preset coefficient; and
    a sum of the first and second products to be a final correction matrix for the pixel point; and
using the final correction matrix for each pixel point to obtain a corrected image.

10. The color correction device of claim 9, wherein:
a sum of the first preset coefficient and the second preset coefficient is 1;
when the first preset coefficient is 0, the pixel point is located on a line V=−U on the UV plane; and
when the second preset coefficient is 0, the pixel point is located on a line V=U on the UV plane.

11. The color correction device of claim 8, wherein determining the first and second adjacent quadrants comprises:
    determining the first adjacent quadrant associated with each pixel point according to a sum of a U value and a V value of the pixel point; and
    determining the second adjacent quadrant associated with each pixel point according to a difference between the U value and the V value of the pixel point; and
performing the color correction comprises:
    determining a first weight coefficient for the first adjacent quadrant using a distance from each pixel point to a line V=−U on the UV plane;

determining a second weight coefficient for the second adjacent quadrant using a distance from each pixel point to a line V=U on the UV plane;

taking a sum of a first product of a first correction matrix, corresponding to the first adjacent quadrant and the image color temperature, and the first weight coefficient and a second product of a second correction matrix, corresponding to the second adjacent quadrant and the image color temperature, and the second weight coefficient to be a final correction matrix for the pixel point; and performing color correction on each pixel point using the final correction matrix for each pixel point to obtain a corrected image.

12. The color correction device of claim 11, wherein a sum of the first weight coefficient and the second weight coefficient is 1.

13. The color correction device of claim 8, wherein each of the correction matrices respectively corresponding to the first and second quadrants and each color temperature is calculated by:

determining all the color patches in the respective first or second quadrant of the UV plane and the chrominance values of all the color patches at each color temperature to form a first chrominance matrix;

determining the standard values corresponding to all the color patches in the respective first or second quadrant of the UV plane at each color temperature to form a second chrominance matrix; and calculating the quotient of the second chrominance matrix and the first chrominance matrix corresponding to the respective first or second quadrant and each color temperature to obtain the correction matrices respectively corresponding to the first and second quadrants and each color temperature.

14. The color correction device of claim 13, wherein the first or second quadrant in which a color patch is located is determined by:

if both the U value and V value of a color patch are less than or equal to a preset threshold, then the color patch is determined to be a neutral color patch and is not added the color patch to any quadrant;

if the U value of the color patch is greater than the preset threshold and the V value of the color patch is less than or equal to the preset threshold, then the color patch is added to the first and second adjacent quadrants according to the U value of the color patch; and if the V value of the color patch is greater than the preset threshold and the U value of the color patch is less than or equal to the preset threshold, then the color patch is added to the first and second adjacent quadrants according to the V value of the color patch.

15. A non-transitory computer-readable storage medium on which computer instructions are stored, the instructions executable by at least one processor to:

obtain an image to be corrected and a color temperature of the image, the image being in a YUV color space;

determine first and second adjacent quadrants in a UV plane associated with each pixel point in the image according to a position of the pixel point on the UV plane; and perform color correction on each pixel point using correction matrices respectively corresponding to the first and second adjacent quadrants and the image color temperature, each correction matrix being calculated in advance of the color corrections according to the chrominance value of a color patch in each of the first and second quadrants, the color temperature, and a standard value corresponding to the color patch.

* * * * *